(12) United States Patent
Kubota

(10) Patent No.: US 12,522,507 B2
(45) Date of Patent: Jan. 13, 2026

(54) METHOD FOR PRODUCING RELATING TO INDUSTRIAL MASS PRODUCTION OF HIGH-PURITY ARTIFICIAL ZEOLITE

(71) Applicant: NAKANISHI INDUSTRY CO., Ltd., Marugame (JP)

(72) Inventor: Mitsuru Kubota, Uruma (JP)

(73) Assignee: Kazuhiro Nakanishi, Kagawa (JP)

( * ) Notice: Subject to any disclaimer, the term of this patent is extended or adjusted under 35 U.S.C. 154(b) by 488 days.

(21) Appl. No.: 17/624,018

(22) PCT Filed: Jul. 19, 2019

(86) PCT No.: PCT/JP2019/028552
§ 371 (c)(1),
(2) Date: Dec. 30, 2021

(87) PCT Pub. No.: WO2021/014513
PCT Pub. Date: Jan. 28, 2021

(65) Prior Publication Data
US 2022/0363555 A1    Nov. 17, 2022

(51) Int. Cl.
*C01B 33/26*    (2006.01)

(52) U.S. Cl.
CPC ........ *C01B 33/2869* (2013.01); *C01B 33/283* (2013.01); *C01B 33/2846* (2013.01); *C01B 33/2853* (2013.01); *C01P 2006/80* (2013.01)

(58) Field of Classification Search
CPC . C01B 33/126; C01B 33/283; C01B 33/2846; C01B 33/2853; C01B 33/2869; C01B 39/14; C01B 39/22; C01B 39/24; C01B 39/26; C01B 39/28; C01B 39/46; C01P 2006/80; C22B 7/02
See application file for complete search history.

(56) References Cited

U.S. PATENT DOCUMENTS 4,130,627 A * 12/1978 Russ .......................... C25C 1/06
423/127
10,773,966 B2   9/2020 Petrik et al.
(Continued)

FOREIGN PATENT DOCUMENTS

| CN | 101928010 A | * | 12/2010 | |
| CN | 104291349 A | * | 1/2015 | ............. C01B 39/04 |

(Continued)

OTHER PUBLICATIONS

Wang et al. Journal of Hazardous Materials 2008, 155, 58-64 (Year: 2008).*

(Continued)

*Primary Examiner* — Sally A Merkling
*Assistant Examiner* — Jordan W Taylor
(74) *Attorney, Agent, or Firm* — The Webb Law Firm

(57) ABSTRACT

A high-purity artificial zeolite is industrially mass produced by carrying out osmosis treatment of fly ash in an alkaline aqueous solution, subsequently carrying out the osmosis treatment again with an acidic aqueous solution of pH 1.0 or less obtained by adding acid to the osmotic aqueous solution of fly ash, then performing solid-liquid separation while water wash and dewatering in a centrifuge, thereby synthesizing a starting composition, and performing hydrothermal reaction treatment to this starting composition.

6 Claims, 8 Drawing Sheets

(56) References Cited

U.S. PATENT DOCUMENTS

| | | | | |
|---|---|---|---|---|
| 2001/0012505 A1* | 8/2001 | Matsukata | ......... | B01D 67/0051 |
| | | | | 423/710 |
| 2019/0153562 A1* | 5/2019 | Wang | ..................... | C01G 49/06 |
| 2019/0177173 A1* | 6/2019 | Itabashi | .................. | C01B 39/46 |

FOREIGN PATENT DOCUMENTS

| | | | | | |
|---|---|---|---|---|---|
| CN | 106946272 | A | * | 7/2017 | ............. C01B 39/26 |
| CN | 108059171 | A | * | 5/2018 | ............. B82Y 40/00 |
| CN | 108946754 | A | | 12/2018 | |
| JP | H7165418 | A | | 6/1995 | |
| JP | H7232913 | A1 | | 9/1995 | |
| JP | 3666031 | B2 | * | 6/2005 | |
| JP | 200799593 | A | | 4/2007 | |
| JP | 2007099593 | A | * | 4/2007 | ............. C01B 39/26 |
| KR | 1020040007911 | | | 7/2002 | |
| WO | 9826101 | A1 | | 6/1998 | |
| WO | WO-2005040437 | A1 | * | 5/2005 | ............... B09B 3/70 |
| WO | 2017221192 | A1 | | 12/2017 | |

OTHER PUBLICATIONS

Chen et al. CN104291349A English Translation (Year: 2015).*
Chun et al. CN101928010A English Translation (Year: 2010).*
Kawai et al. JP3666031B2 English Translation (Year: 2005).*
Liu et al. CN108059171A English Translation (Year: 2018).*
Schneider et al. Journal of Solution Chemistry, 2004, 33, 3 (Year: 2004).*
Shih et al. Materials Letters 1996, 28, 263-268 (Year: 1996).*
Fan et al. CN106946272A English Machine Translation (Year: 2017).*
Shimoda et al. JP2007099593A English Machine Translation (Year: 2007).*
OxyChem, Hydrochloric Acid Calculate pH Values of Hydrochloric Acid Solutions, Mar. 23, 2011 (Year: 2011).*
Kuramochi et al. (WO2005040437A1 English) (Year: 2005).*
Miyake et al., "Resource Recovery of Waste Incineration Fly Ash: Synthesis of Zeolites A and P", Journal of the American Ceramic Society, 2002, pp. 1873-1875, vol. 85, Issue 7.

* cited by examiner

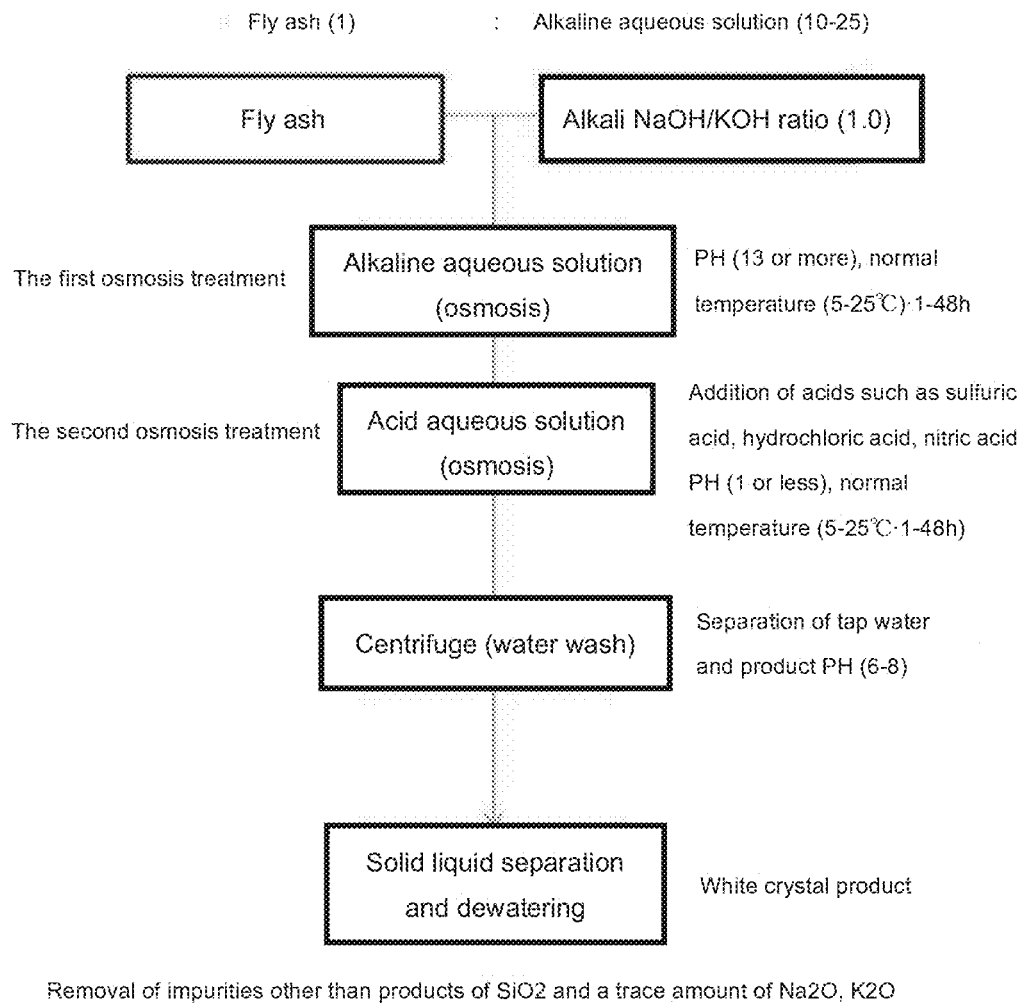

[Figure 2]
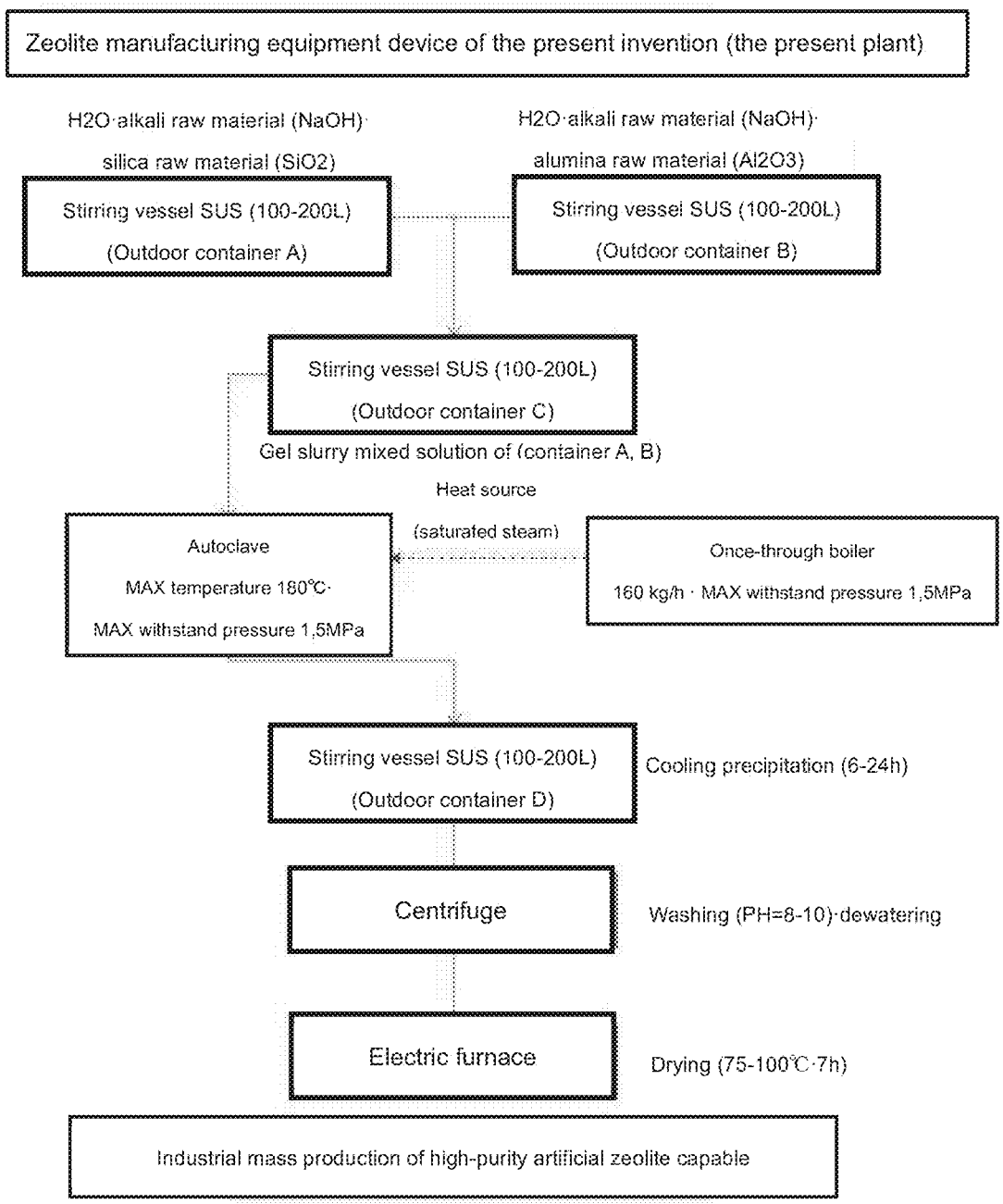

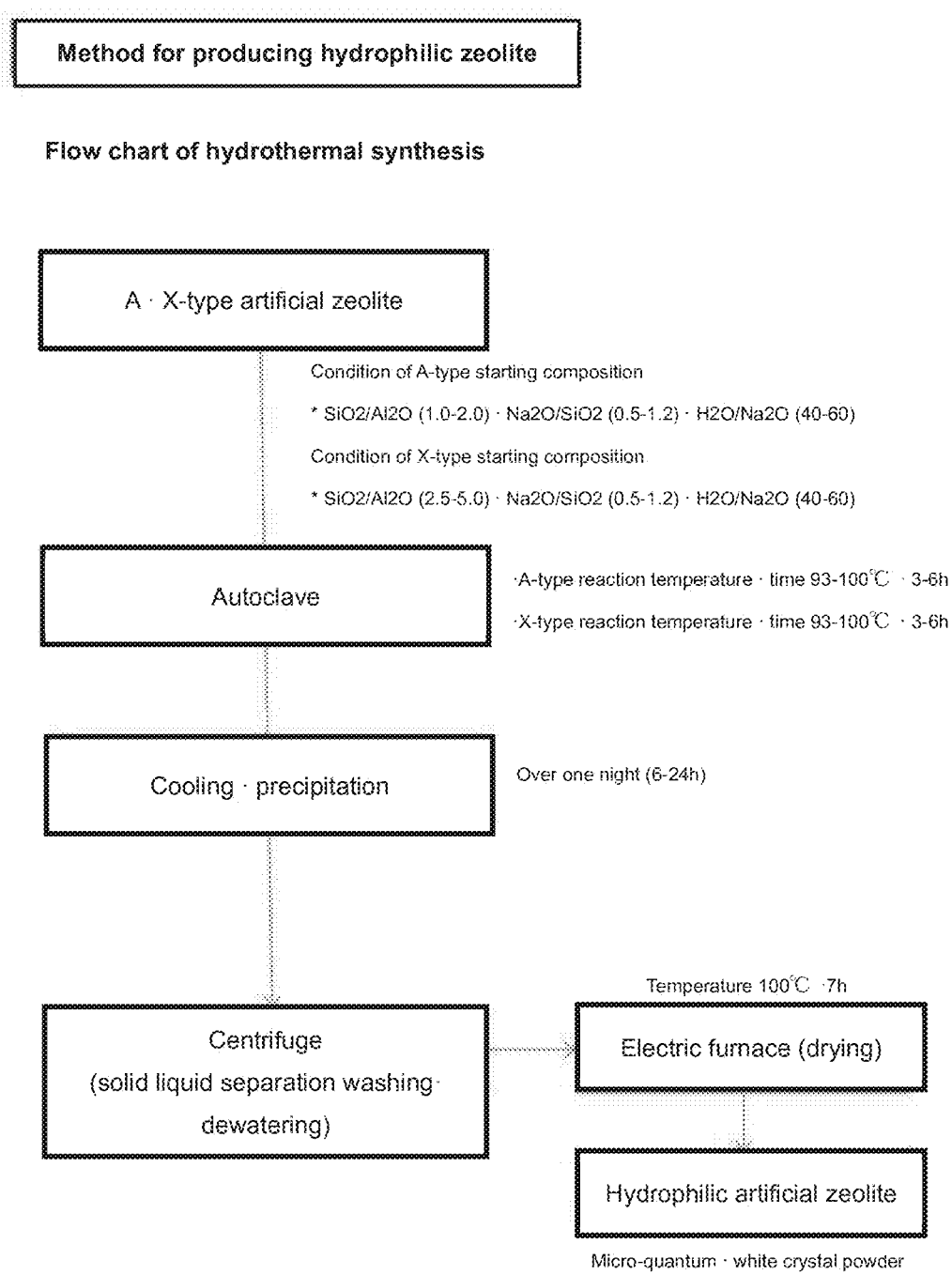
[Figure 3]

[Figure 4]
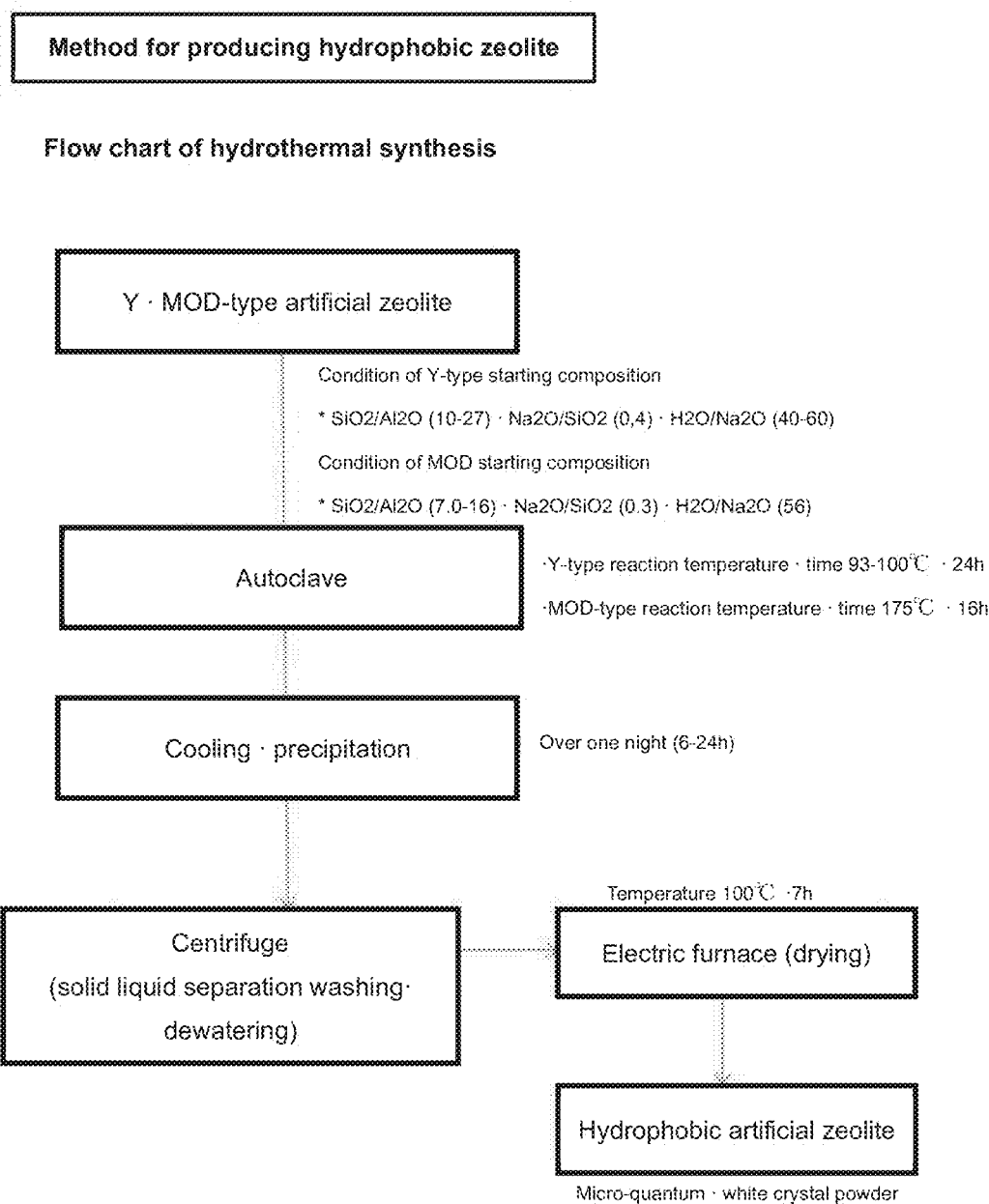

[Figure 5]
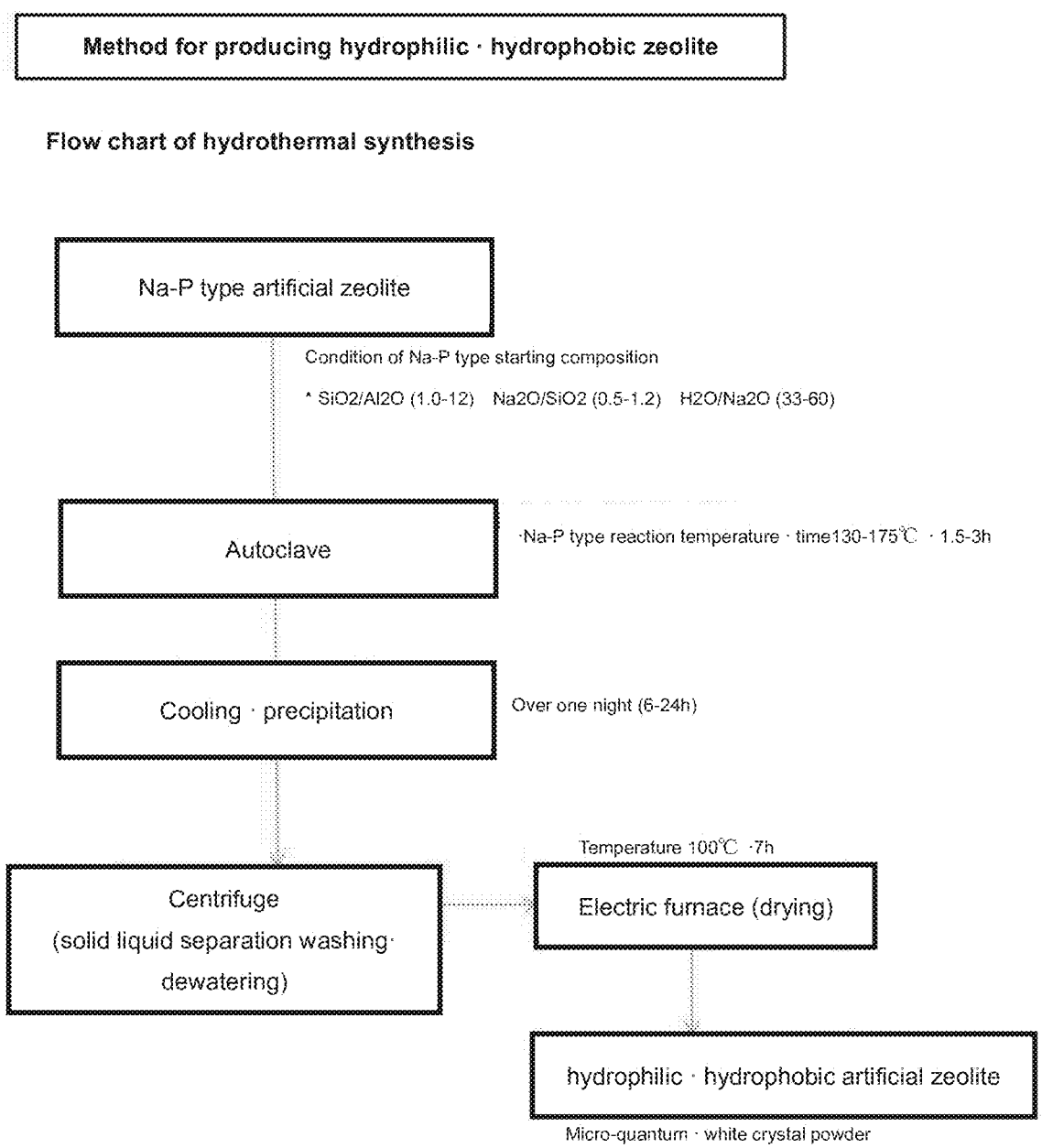

[Figure 6]
[Figure 6-a] [Example 1] The present high-purity A-type artificial zeolite    X-ray analysis data diagram
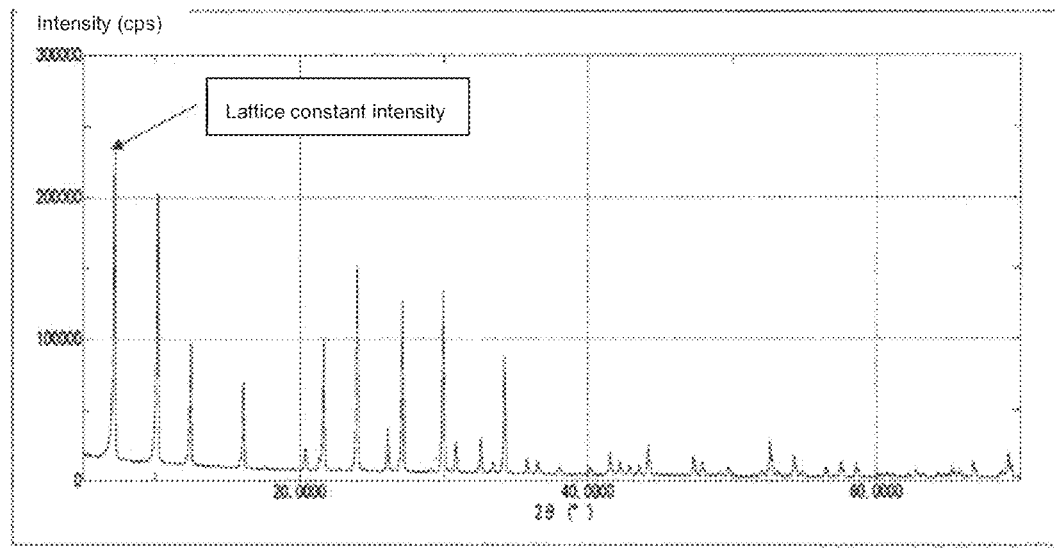
[Figure 6-b] [Comparative example 1] The conventional A-type artificial zeolite    X-ray analysis data
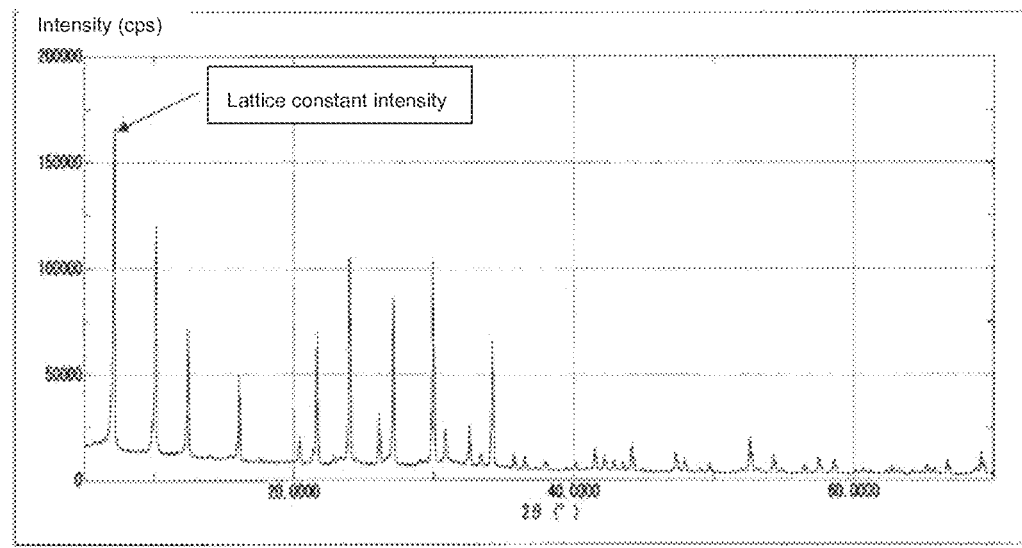

【Figure 7】
[Figure 7-a] [Example 2] The present high-purity X-type artificial zeolite    X-ray analysis data diagram
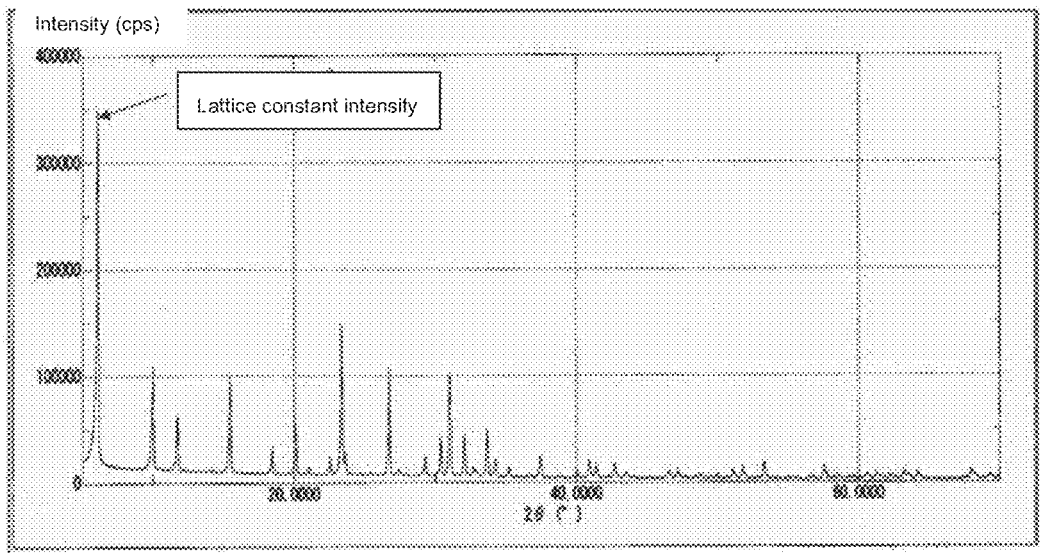
[Figure 7-b] [Comparative example 2] The conventional X-type artificial zeolite    X-ray analysis data diagram
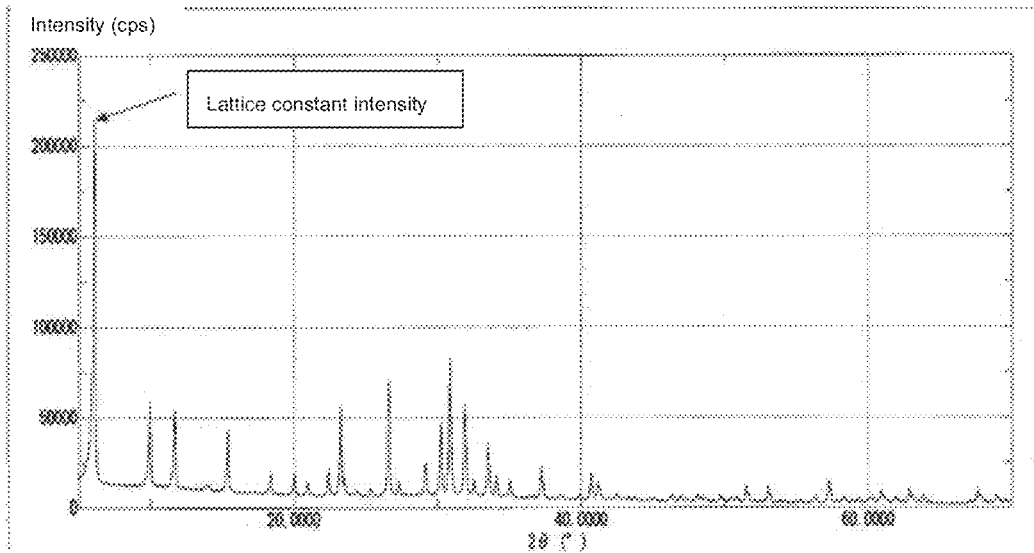

[Figure 8]
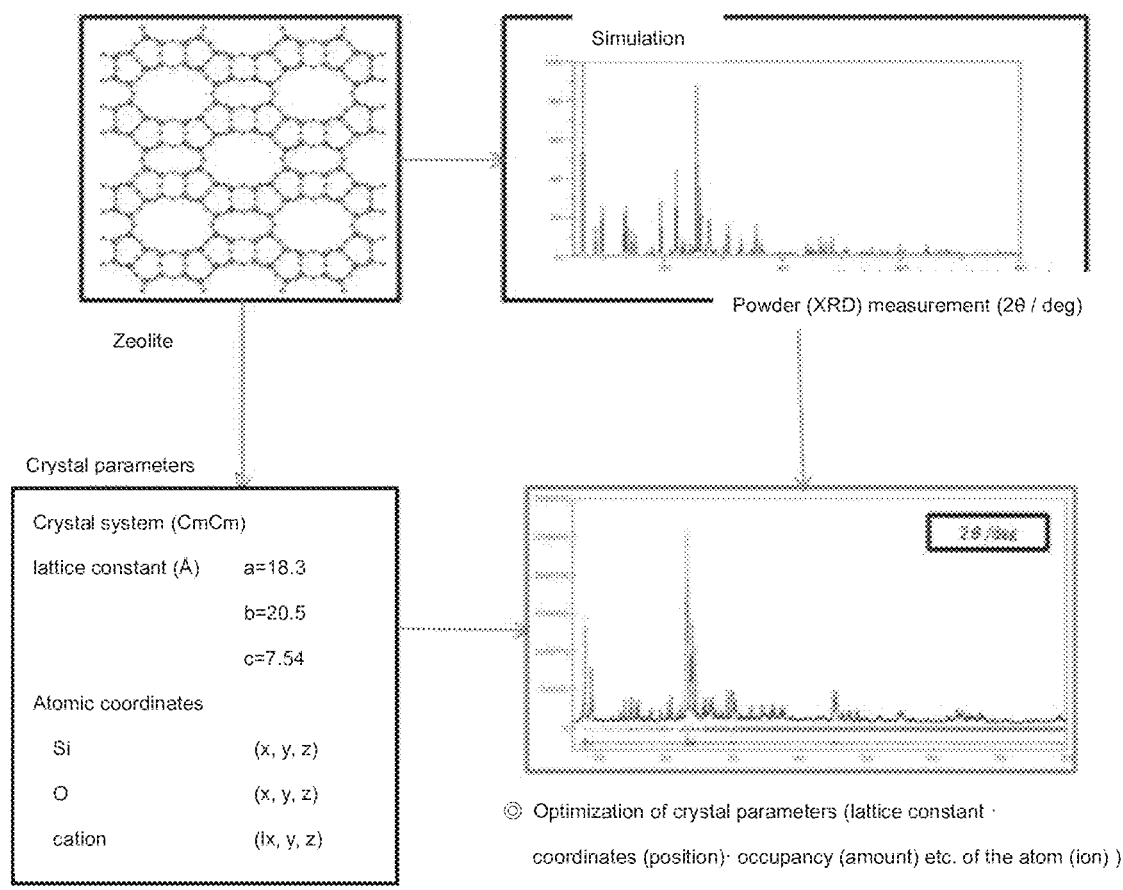

METHOD FOR PRODUCING RELATING TO INDUSTRIAL MASS PRODUCTION OF HIGH-PURITY ARTIFICIAL ZEOLITE

CROSS-REFERENCE TO RELATED APPLICATION

This application is the United States national phase of International Application No. PCT/JP2019/028552 filed Jul. 19, 2019, the disclosure of which is hereby incorporated by reference in its entirety.

TECHNICAL FIELD

The present invention relates to a method for producing artificial zeolite using fly ash as raw material, especially the method for producing relating to industrial mass production of high-purity artificial zeolite.

BACKGROUND ART

In hydrothermal synthesis of zeolite, the starting composition comprises at least four components (in molar ratios), namely alkali (oxides of (NaOH, KOH) and the like (a base)), alumina, silica, and water, and zeolites are categorized into natural zeolite which exist naturally, synthetic zeolite which are synthesized by reagents, and artificial zeolite which are from waste and the like (fly ash, glass waste, etc.). The below-mentioned table 1 is the categorization of zeolites.

TABLE 1

|  | Raw material | Price | Degree of purity | Principle use |
|---|---|---|---|---|
| Synthetic zeolite | Chemical substances | Δ |  | Industrial use (Chemical · pharmaceutical · automobile industry etc. Dehydrating agent, adsorption of various ingredients, catalyst, etc.) |
| Artcisl zecize | Coal ash etc. | ○ | ○ | Water treatment, deodorant, soil conditioner, toxic substance remover |
| Nasrrsl zecite | Produced naturally | ◎ | Δ | Soil conditioner, pet deodorant, water treatment, feed use |

High-purity synthetic zeolites are crystalized under conditions such as temperature condition and reaction time using four components (not containing impurities) from "raw materials such as sodium hydroxide, potassium hydroxide as alkali raw material, water glass, colloidal silica, sodium silicate and the like as silica raw material, sodium aluminate, aluminum hydroxide, aluminum nitrate and the like as alumina raw material, and water", in which the raw material are reagents, as the starting composition. Therefore, in the assessment of synthetic zeolites using reagents, it may be said as high-purity synthetic zeolite when the relative intensity ratio of the "X-ray diffraction pattern intensity" (hereinafter referred to as lattice constant) is the same.

On the other hand, though there are many productions of artificial zeolites using coal ash (fly ash) as raw material, since other than oxides of the four components necessary for zeolite conversion, namely "silica raw material ($SiO_2$)", "alumina raw material ($Al_2O_3$)", "alkali raw material ($Na_2O$, $K_2O$)", impurities of iron, calcium, magnesium, sulfur, fluorine, boron, carbon compounds are contained in fly ash and most artificial zeolites produced without treating fly ash with some sort of method completely differ with the X-ray diffraction (lattice constant) relative intensity value of synthetic zeolite, it may be assessed as artificial zeolite of low-purity. The below-mentioned table 2 is the analysis value of the trial fly ash, ash of Datong, China.

TABLE 2

China (Ash of Detong) Analysis value of the trial by ash (%) Provision of reference: Electric Power Development Co., LTD.

| $Si_2O$ | $Al_2O_2$ | $Fe_2O$ | CaO | MgO | $Na_2O$ | $K_2O$ | $SO_3$ | $P_2O_2$ | $TiO_2$ | $Li_2O$ | $V_2O_5$ | MnO | F | CL | B | Carbon Compound (heavy metals) |
|---|---|---|---|---|---|---|---|---|---|---|---|---|---|---|---|---|
| 58.7 | 13.54 | 3.72 | 9.84 | 1.66 | 1.36 | 0.92 | 4.61 | 0.45 | 3.33 | 0.02 | 0.05 | 0.01 | 74 mg | 200 mg | 58 mg | several % |

Patent literature 1 (Japanese Patent Application H07-165418) discloses that conventionally, for producing an artificial zeolite using coal ash (fly ash) as raw material, most methods for producing perform hydrothermal reaction with an alkaline aqueous solution without removing impurities contained in fly ash in advance.

Moreover, stating that it is not especially limited as long as the iron content, calcium, sodium, magnesium and other impurities contained in fly ash can be dissolved and washed using strong acid, patent literature 1 discloses dissolving with a strongly acidic aqueous solution such as sulfuric acid, hydrochloric acid (90 weight percent to 100 weight percent concentration, 10 to 50 volume percent concentration) as a specific example. With low concentration less than the above-mentioned predetermined range, impurities dissolve poorly and pickling cannot be sufficiently performed. Moreover, it is described that even if it exceeds the above-mentioned predetermined range, the washing effect is not improved so much, and it is not practical from the viewpoint of usage efficiency. Further, it is described that in this method for producing, if one or more zeolitic auxiliary agents selected from sodium aluminate, colloidal silica and sodium silicate is added to the mixture, the purification of zeolite is further promoted.

Moreover, it is described in Examples 1 to 6 of patent literature 1 that fly ash was used as raw material, and that 1 liter of an aqueous solution of 30 volume percent industrial concentrated sulfuric acid was warmed to 80° C., 500 g of fly ash was put in and left for 3 hours. Next, the dissolved component was washed and removed by water. Then, 50 g of fly ash after washing and the required amount of NaOH and colloidal silica was put in 100 ml of water and mixed and stirred, then sodium aluminate was dissolved in 200 ml of water, was added to said heated mixture while stirring, was reacted at reaction temperature, reaction time, stationary state, and thereafter, filtering off the solid content, zeolites of Examples 1 to 6 were obtained.

However, the conventionally known method for producing artificial zeolite is a synthesis method in laboratory scale preparing samples of small amounts over hours and cannot be said to be capable of mass production industrially.

SUMMARY OF THE INVENTION

The purpose of the invention is to provide a method for producing high-purity artificial zeolite suited for mass production in industrial scale, not laboratory scale.

In the present invention, impurities other than necessary during artificial zeolite conversion from fly ash is removed by firstly carrying out soaking treatment of fly ash in an alkaline aqueous solution, subsequently carrying out the soaking treatment again with a pH (1.0 or less) acidic aqueous solution obtained by adding acid (hydrochloric acid, sulfuric acid, nitric acid, and the like) to the alkaline aqueous solution (fly ash soaking treatment solution), then performing solid-liquid separation while water wash and dewatering in a centrifuge. thereby synthesizing a starting composition, and performing hydrothermal reaction treatment to this starting composition. By this, out of the four components for artificial zeolite conversion, silica raw material ($SiO_2$), a trace amount of alkali raw material ($Na_2O$, $K_2O$) containing products other than $SiO_2$, a trace amount of $Na_2O$, $K_2O$ in a trace amount having little effect during artificial zeolite conversion is obtained, and the starting composition comprising also the deficient components sodium aluminate, aluminum hydroxide, and water is performed with hydrothermal reaction treatment. By this method for producing, a method for producing relating to industrial mass production of a high-purity artificial zeolite which its X-ray diffraction (lattice constant) relative intensity value is approximately equivalent to synthetic zeolite was found, and have come to complete the present invention.

The present invention regards to a method for producing an artificial zeolite in which a high-purity artificial zeolite is industrially mass produced by carrying out osmosis treatment of fly ash in an alkaline aqueous solution, subsequently carrying out the osmosis treatment again with an acidic aqueous solution of pH 1.0 or less obtained by adding acid to the osmotic aqueous solution of fly ash, then performing solid-liquid separation while water wash and dewatering in a centrifuge, thereby synthesizing a starting composition, and performing hydrothermal reaction treatment to this starting composition.

The mass ratio of said fly ash and the alkaline aqueous solution is preferably 1:10 to 25. Moreover, regarding said alkaline aqueous solution, the molar ratio of NaOH/KOH is preferably 1.0 and the pH is preferably 13.0 or more. soaking treatment is carried out to said alkaline aqueous solution at normal temperature of 5 to 25 degrees for 1 to 48 hours. And then, an acid aqueous solution is added, and soaking treatment is carried out at normal temperature of 5 to 25 degrees for 1 to 48 hours. Said acid is preferably sulfuric acid, hydrochloric acid, or nitric acid, and the like. Thereafter, solid-liquid separation is performed while water wash in a centrifuge. A white crystal product like silica is obtained by dewatering. By the above method, impurities other than products of $SiO_2$ and a trace amount of alkali $Na_2O$, $K_2O$ can be removed. The flow chart of this method is shown in FIG. 1.

The zeolite manufacturing equipment device (the present plant) of the present invention is shown in FIG. 2.

Industrial mass production of high-purity artificial zeolite is capable by using a series of manufacturing equipment (notated as the present plant), such as a high-temperature and high-pressure device (autoclave) of maximum capacity 130 L (maximum temperature 180° C.·maximum pressure 1.5 MPa)·a once-through boiler (160 kg/h·1.5 Mpa)·a centrifuge·an electric furnace.

Regarding a method for producing relating to industrial mass production of high-purity artificial zeolite, since zeolites are roughly classified into zeolites showing hydrophilicity with low $SiO_2/Al_2O_3$ ratio (A-type $SiO_2/Al_2O_3$=1.0 to 2.0·X-type $SiO_2/Al_2O_3$=2.5 to 5.0) etc. and zeolites having hydrophobicity such as CHA, MOD-MOR-type (mordenite), Y-type with high $SiO_2/Al_2O_3$ ratio, the method of producing a representative hydrophilic A-type artificial zeolite and a hydrophobic Y-type artificial zeolite using a starting composition of $SiO_2$, a trace amount of $Na_2O$, KOH, which are obtained by the method for removing impurities other than necessary during artificial zeolite conversion, and others, namely sodium aluminate, aluminum hydroxide as alumina raw material, sodium hydroxide as alkali raw material, water, is described in the Examples using the zeolite device (the present plant).

BRIEF DESCRIPTION OF DRAWINGS

FIG. 1 A flow chart of the method of the first alkaline solution treatment. the second acid aqueous solution osmosis treatment with regards to removing impurities during artificial zeolite conversion.

FIG. 2 A flow chart of the manufacturing equipment device in the present invention (the present plant).

FIG. 3 A flow chart of hydrothermal synthesis with regards to the method for producing hydrophilic zeolite (A-type·X-type artificial zeolite).

FIG. 4 A flow chart of hydrothermal synthesis with regards to the method for producing hydrophobic zeolite (Y·MOR-type (mordenite) artificial zeolite).

FIG. 5 A flow chart of hydrothermal synthesis with regards to the method for producing hydrophilic·hydrophobic zeolite (Na—P-type artificial zeolite).

FIG. 6 A comparison diagram of the X-ray analysis data diagram of high-purity A-type artificial zeolite and low-purity A-type artificial zeolite. The relationship between lattice constant intensity and reaction time is graphed.

FIG. 7 A comparison diagram of the X-ray analysis data diagram of high-purity X-type artificial zeolite and low-purity X-type artificial zeolite. The relationship between lattice constant intensity and reaction time is graphed.

FIG. 8 A technical material of crystal structure analysis (Rietveld refinement) of zeolite.

DETAILED DESCRIPTION OF THE INVENTION

Examples

Example 1

The below-mentioned is the method for producing a representative hydrophilic A-type artificial zeolite.

As the production condition for making the A-type artificial zeolite a single crystalline phase, for the starting composition, the A-type starting composition is made to comprise in molar ratios 2.0 for $SiO_2/Al_2O_3$, 1.0 for $Na_2O/SiO_2$, 56 for $H_2O/Na_2O$.

The ratio of the four components is made up of $SiO_2$ obtained by removing impurities as silica raw material (ignoring the trace amount of alkali $Na_2O$), sodium hydroxide as alkali raw material, aluminum hydroxide as alumina raw material, and water.

20.2 kg of fly ash from which impurities were removed ($SiO_2$ is 11.85 kg since the $SiO_2$ concentration of fly ash is 58.7%) was added to 100 liters of 2.0N alkaline aqueous solution (8.0 kg of NaOH and 92.0 liters of $H_2O$), stirred for 0.3 to 1 hour, and a translucent solution was obtained. Then, 16.9 kg of aluminum hydroxide ($Al_2O_3$ is 10.05 kg since $Al_2O_3$ is contained of 59.5% in the above-mentioned aluminum hydroxide) was added to this solution, stirred until it became a white turbid solution, then the gel slurry solution kept at 60 to 40° C. was transferred to an autoclave, and with the setting of 100° C. temperature and 4 hours reaction time, hydrothermal reaction treatment was performed and the gel slurry of A-type artificial zeolite composition was obtained. After performing cooling precipitation for 1 to 24 hours to the gel slurry of the A-type composition, tap water was removed and while washing, solid liquid separation and dewatering at pH 10 or less was performed in a centrifuge, subsequently dried in an electric furnace at 100° C. for 7 hours, and crystallization of hydrophilic white A-type artificial zeolite was obtained. Regarding lattice constant (A) upon XRD analysis of the obtained crystal composition, high-purity A-type artificial zeolite was industrially mass produced (42.29 kg per batch).

Further, a comparison diagram of the X-ray analysis data diagram of the A-type artificial zeolite of Example 1 is shown in FIG. 6. This graphs the relationship between lattice constant intensity and reaction time. The X-ray analysis data are shown in FIG. 6-*a* for the A-type artificial zeolite of Example 1 of the present application and in FIG. 6-*b* for the conventional A-type artificial zeolite as Comparative Example 1.

The lattice constant intensity (CPS) of Example 1 of the present application of FIG. 6-*a* is 240000. On the other hand, the lattice constant intensity (CPS) of Comparative Example FIG. 6-*b* is 165000.

The ratio of the lattice constant intensity of Comparative Example and Example 1 is 165000/240000=0.666.

Therefore, the lattice constant intensity of FIG. 6-*b* is low and the conventional A-type artificial zeolite cannot be called high-purity artificial zeolite.

Out of the above-mentioned molar ratios, $SiO_2/Al_2O_3$ becomes 1.0 for the below-mentioned reason.

Since the mass of $SiO_2$ is 11.85 kg, and the molecular weight of $SiO_2$ is 60, 11.85/60 is 0.1975.

Since the mass of $Al_2O_3$ is 10.05 kg, and the molecular weight of $Al_2O_3$ is 102, 10.05/102 is 0.09852.

Therefore, the molar ratio $SiO_2/Al_2O$ is 0.1975/0.09852, namely 2.0.

Out of the above-mentioned molar ratios, $Na_2O/SiO_2$ becomes 1.0 for the below-mentioned reason.

Since 99 percent of 8.0 kg of NaOH becomes $Na_2O$, the mass of $Na_2O$ is 7.92 kg. Replaced with NaOH, since the molecular weight of NaOH is 40, 7.92/40 is 0.198.

Since the mass of $SiO_2$ is 11.85 kg, and the molecular weight of $SiO_2$ is 60, 11.85/60 is 0.1975.

Therefore, the molar ratio $Na_2O/SiO_2$ is 0.198/0.1975, namely 1.0.

Out of the above-mentioned molar ratios, $H_2O/Na_2O$ becomes 56 for the below-mentioned reason.

Since the alkaline solution is an alkaline solution of 2.0N in Example 1, $H_2O/Na_2O$ is 56 with regards to the concentration of 2.0N of NaOH from the below-mentioned table 3. Table 3 is a chart of molar ratios.

TABLE 3

| Na2O (NaOH) alkaline aqueous solution concentration chart | | | | | | | | | | | |
|---|---|---|---|---|---|---|---|---|---|---|---|
| NaOH (N) | 1.0 | 1.1 | 1.2 | 1.3 | 1.4 | 1.5 | 1.6 | 1.7 | 1.8 | 1.9 | 2.0 |
| H2O/Na2O molar ratio | 79.0 | 76.7 | 74.4 | 72.1 | 69.8 | 67.5 | 65.2 | 62.9 | 60.6 | 58.3 | 56.0 |
| NaOH (N) | 2.1 | 2.2 | 2.3 | 2.4 | 2.5 | 2.6 | 2.7 | 2.8 | 2.9 | 3.0 | |
| H2O/Na2O molar ratio | 53.7 | 51.4 | 49.1 | 46.8 | 44.5 | 42.2 | 39.9 | 37.6 | 35.3 | 33.0 | |

*From the molar ratio chart, the concentration of 2.0N of NaOH is H2O/Na2O (56).

Example 2

The below-mentioned is the method for producing a representative hydrophilic X-type artificial zeolite.

As the production condition for making the X-type artificial zeolite a single crystalline phase, for the starting composition, the X-type starting composition is made to comprise in molar ratios 5.0 for $SiO_2/Al_2O_3$, 0.8 for $Na_2O/SiO_2$, 40 for $H_2O/Na_2O$.

The ratio of the four components is made up of $SiO_2$ obtained by removing impurities as silica raw material (ignoring the trace amount of alkali $Na_2O$), sodium hydroxide as alkali raw material, aluminum hydroxide as alumina raw material, and water.

30.6 kg of fly ash from which impurities were removed ($SiO_2$ is 17.96 kg since the $SiO_2$ concentration of fly ash is 58.7%) was added to 100 liters of 2.7N alkaline aqueous solution (10.0 kg of NaOH and 90.0 liters of $H_2O$), stirred for 0.3 to 1 hour, and a translucent solution was obtained. Then, 10.2 kg of aluminum hydroxide ($Al_2O_3$ is 6.069 kg since $Al_2O_3$ is contained of 59.5% in the above-mentioned aluminum hydroxide) was added to solution (A), stirred until it became a white turbid solution, then the gel slurry solution (B) kept at 60 to 40° C. was transferred to an autoclave and with the setting of 100° C. temperature 5 hours reaction time, hydrothermal reaction treatment was performed and the gel slurry of X-type artificial zeolite product was sought. After performing cooling precipitation for 1 to 24 hours to the gel slurry of the X-type product, tap water was removed and while washing, solid liquid separation and dewatering at pH (10 or less) was performed in a centrifuge, subsequently dried in an electric furnace (100° C. 7 hours), and crystallization of hydrophilic white X-type artificial zeolite was obtained. Regarding lattice constant (A) upon powder XRD analysis of the obtained crystal product, high-purity X-type artificial zeolite (table 2) was industrially mass produced (46.51 kg per batch).

Further, a comparison diagram of the X-ray analysis data diagram of the X-type artificial zeolite of Example 2 is shown in FIG. 7. This graphs the relationship between lattice constant intensity and reaction time.

The X-ray analysis data are shown in FIG. 7-$a$ for the X-type artificial zeolite of Example 2 of the present application and in FIG. 7-$b$ for the conventional X-type artificial zeolite as Comparative Example 2.

The lattice constant intensity (CPS) of Example 2 of the present application of FIG. 7-$a$ is 350000. On the other hand, the lattice constant intensity (CPS) of Comparative Example 2 of FIG. 7-$b$ is 230000.

The ratio of the lattice constant intensity of Comparative Example 2 and Example 2 becomes 230000/350000=0.657.

Therefore, the lattice constant intensity of Comparative Example 2 of FIG. 7-$b$ is low and the conventional X-type artificial zeolite cannot be called high-purity artificial zeolite.

Further, the calculation of molar ratio of X-type artificial zeolite starting composition of Example 2 is the same with the method of calculation of A-type artificial zeolite of Example 1. The same applies to the following.

Example 3

The below-mentioned is the method for producing a representative hydrophobic Y-type artificial zeolite.

As the production condition for making the Y-type artificial zeolite a single crystalline phase, for the starting composition, the Y-type starting composition is made to comprise in molar ratios 10 for $SiO_2/Al_2O_3$, 0.5 for $Na_2O/SiO_2$, 44.5 for $H_2O/Na_2O$. Similar to the description in Example 1, the ratio of the four components is made up of $SiO_2$ obtained by removing impurities as silica raw material (ignoring the trace amount of alkali $Na_2O$), aluminum hydroxide as alkali raw material, aluminum hydroxide as alumina raw material, and water. 50.5 kg of fly ash from which impurities were removed ($SiO_2$ is 29.64 kg since the $SiO_2$ concentration of fly ash is 58.7%) was added to 50 liters of 2.5N NaOH aqueous solution (5 kg of NaOH and 45 liters of $H_2O$), stirred for 0.5 to 1 hour, and a translucent solution is obtained. Next, 8.4 kg of aluminum hydroxide ($Al_2O_3$ is 4.998 kg since $Al_2O_3$ is contained of 59.5% in the above-mentioned aluminum hydroxide) was added, stirred until it became a white turbid solution and a gel slurry solution was obtained, then a translucent solution was added to the gel slurry solution, transferred to an autoclave, and after being aged for 12 to 24 hours keeping 60 to 50° C., with the setting of 100° C. temperature and 24 hours reaction time, hydrothermal reaction treatment was performed and the gel slurry of Y-type artificial zeolite composition was sought. After performing cooling precipitation for 1 to 24 hours to the gel slurry of the Y-type composition, tap water was removed and while washing, solid liquid separation and dewatering at pH (10 or less) was performed in a centrifuge, subsequently dried in an electric furnace (100° C., 7 hours), and crystallization of hydrophilic white Y-type artificial zeolite was obtained. Regarding lattice constant (A) upon powder XRD analysis of the obtained crystal composition, high-purity Y-type artificial zeolite was industrially mass produced (67.1 kg per batch).

Example 4

The below-mentioned is the method for producing a representative hydrophobic MOD-MOR-type (mordenite) artificial zeolite.

As the production condition for making the MOR-type (mordenite) artificial zeolite a single crystalline phase, for the starting composition, the MOR-type (mordenite) starting composition is made to comprise in molar ratios 15.6 for $SiO_2/Al_2O_3$, 0.3 for $Na_2O/SiO_2$, 56 for $H_2O/Na_2O$. The ratio of the four components is made up of $SiO_2$ obtained by removing impurities as silica raw material (ignoring the trace amount of alkali $Na_2O$), sodium hydroxide as alkali raw material, aluminum hydroxide as alumina raw material, and water.

33.7 kg of fly ash from which impurities were removed ($SiO_2$ is 19.78 kg since the $SiO_2$ concentration of fly ash is 58.7%) was added to 50 liters of 2.0N alkaline aqueous solution (4.0 kg of NaOH and 46.0 liters of $H_2O$), stirred for 0.3 to 1 hour, and a translucent solution was obtained. Then, 3.6 kg of aluminum hydroxide ($Al_2O_3$ is 2.142 kg since $Al_2O_3$ is contained of 59.5% in the above-mentioned aluminum hydroxide) was added to this solution, stirred until it became a white turbid solution and a gel slurry solution (B) was obtained, then a translucent solution (A) is added to the gel slurry solution (B), transferred to an autoclave, and after being aged for 12 to 24 hours keeping 60 to 50° C., with the setting of 175° C. temperature. 16 hours reaction time, hydrothermal reaction treatment was performed and the gel slurry of MOR-type (mordenite) artificial zeolite product was sought. After performing cooling precipitation for 1 to 24 hours to the gel slurry of MOR-type (mordenite) product, tap water was removed and while washing, solid liquid separation and dewatering at pH (10 or less) was performed in a centrifuge, subsequently dried in an electric furnace (100° C., 7 hours), and crystallization of hydrophilic white MOR-type (mordenite) artificial zeolite was obtained. Regarding lattice constant (A) upon powder XRD analysis of the obtained crystal product, high-purity MOR-type (mordenite) artificial zeolite was industrially mass produced (42.5 kg per batch).

The below-mentioned is the method for producing Na—P type artificial zeolite which can produce both a representative hydrophilic and hydrophobic.

Example 5

As the production condition for making the hydrophilic Na—P type artificial zeolite a single crystalline phase, for the starting composition, the hydrophilic Na—P type starting composition is made to comprise in molar ratios 2 for $SiO_2/Al_2O_3$, 1.0 for $Na_2O/SiO_2$, 33 for $H_2O/Na_2O$. Similar to the description in Example 1, the ratio of the four components is made up of $SiO_2$ obtained by removing impurities as silica raw material (ignoring the trace amount of alkali $N_2O$), aluminum hydroxide as alkali raw material, aluminum hydroxide as alumina raw material, and water.

30.7 kg of fly ash from which impurities were removed ($SiO_2$ is 18.02 kg since the $SiO_2$ concentration of fly ash is 58.7%) was added to 100 liters of 3N NaOH aqueous solution (12 kg of NaOH and 88 liters of $H_2O$), stirred for 0.5 to 1 hour, and a translucent solution was obtained. Next, 25.4 kg of aluminum hydroxide ($Al_2O_3$ is 15.11 kg since $Al_2O_3$ is contained of 59.5% in the above-mentioned aluminum hydroxide) was added to the solution, stirred until it became a white turbid solution and a gel slurry solution was obtained, then transferred to an autoclave keeping the state of 60 to 40° C. temperature, and with the setting of 175° C. temperature and 1.5 hours reaction time, hydrothermal reaction treatment was performed and the gel slurry of Na—P type artificial zeolite composition was obtained. After performing cooling precipitation for 1 to 24 hours to the gel slurry of the Na—P type artificial zeolite composition, tap water was removed and while washing, solid liquid separation and dewatering at pH (10 or less) was performed in a centrifuge, subsequently dried in an electric furnace (100° C., 7 hours), and crystallization of hydrophilic white Na—P type artificial zeolite was obtained. The obtained crystal composition was a crystal of hydrophilic high-purity Na—P type artificial zeolite having high lattice constant (A) upon powder XRD analysis.

Example 6

As the production condition for making the hydrophobic Na—P type artificial zeolite a single crystalline phase, for the starting composition, the hydrophobic Na—P type starting composition is made to comprise in molar ratios 10 for $SiO_2/Al_2O_3$, 0.5 for $Na_2O/SiO_2$, 56 for $H_2O/Na_2O$. Similar to the description in Example 1, the ratio of the four components is made up of $SiO_2$ obtained by removing impurities as silica raw material, sodium hydroxide of $Na_2O$, which tends to be deficient, as alkali raw material, aluminum hydroxide as alumina raw material, and water.

40.4 kg of fly ash from which impurities were removed ($SiO_2$ is 23.71 kg since the $SiO_2$ concentration of fly ash is 58.7%) was added to 50 liters of 2N NaOH aqueous solution (NaOH (4.0 kg) and $H_2O$ (45 liters)), stirred for 0.5 to 1 hour, and a translucent solution was obtained. Next, 50 liters of 2N NaOH aqueous solution (4 kg of NaOH and 45 liters of $H_2O$), 6.77 kg of aluminum hydroxide ($Al_2O_3$ is 4.02 kg since $Al_2O_3$ is contained of 59.5% in the above-mentioned aluminum hydroxide) was added, stirred until it became a white turbid solution and a gel slurry solution was obtained. A translucent solution was added to the gel slurry solution and transferred to an autoclave keeping the state of 60 to 40° C. temperature, and with the setting of 110° C. temperature and 6 hours reaction time, hydrothermal reaction treatment was performed and the gel slurry of Na—P type artificial zeolite composition was obtained. After performing cooling precipitation for 1 to 24 hours to the gel slurry of the Na—P type composition, tap water was removed and while cleaning, solid liquid separation and dewatering at pH (10 or less) was performed in a centrifuge, subsequently dried in an electric furnace (100° C., 7 hours), and crystallization of hydrophobic white Na—P type artificial zeolite was obtained. The obtained crystal composition was a crystal of hydrophobic high-purity Na—P type artificial zeolite having high lattice constant (A) upon powder XRD analysis.

From the above-mentioned, in the production for making the A-type artificial zeolite a single crystalline phase, the A-type starting composition is preferrable to comprise in molar ratios 1.0 to 2.0 for $SiO_2/Al_2O_3$, 0.5 to 1.2 for $Na_2O/SiO_2$, 40 to 60 for $H_2O/Na_2O$.

In the production for making the X-type artificial zeolite a single crystalline phase, the X-type starting composition is preferrable to comprise in molar ratios 2.5 to 5.0 for $SiO_2/Al_2O_3$, 0.5 to 1.2 for $Na_2O/SiO_2$, 40 to 60 for $H_2O/Na_2O$.

In the production for making the Y-type artificial zeolite a single crystalline phase, the X-type starting composition is preferrable to comprise in molar ratios 10 to 27 for $SiO_2/Al_2O_3$, 0.5 for $Na_2O/SiO_2$, 40 to 60 for $H_2O/Na_2O$.

In the production for making the MOD-MOR-type (mordenite) artificial zeolite a single crystalline phase, it is preferrable to comprise 7.0 to 16 for $SiO_2/Al_2O_3$, 2.6 for $Na_2O/SiO_2$, 56 for $H_2O/Na_2O$.

In the production for making the Na—P type artificial zeolite a single crystalline phase, the Na—P type starting composition is preferrable to comprise in molar ratios 1.0 to 12 for $SiO_2/Al_2O_3$, 0.5 to 1.2 for $Na_2O/SiO_2$, 33 to 60 for $H_2O/Na_2O$.

Further, FIG. 8 is a technical material of crystal structure analysis (Rietveld refinement) of zeolite.

Zeolites have a pore structure called a channel in the crystal structure and can adsorb cations and water molecules in the internal cavity. By these features, zeolites are widely used industrially as catalysts, molecular sieves, adsorbents, and the like.

Information on crystal structure and ion is important in zeolite development, so information is obtained using powder X-ray (XRD Rietveld refinement) and the XRD pattern is simulated from lattice constant and atomic coordinates, and fitting of the actual measured powder XRD pattern is performed.

Herewith, evaluation decision of various zeolites is made by the coordinates, occupancy of the atom (ion).

As above, the present invention regards to a method for producing an artificial zeolite in which a high-purity artificial zeolite is industrially mass produced by carrying out soaking treatment of fly ash in an alkaline aqueous solution, subsequently carrying out the soaking treatment again with an acidic aqueous solution of pH 1.0 or less obtained by adding acid to the soaking aqueous solution of fly ash, then performing solid-liquid separation while water wash and dewatering in a centrifuge, thereby synthesizing a starting composition, and performing hydrothermal reaction treatment to this starting composition. Therefore, it is a method for producing suited for mass production in industrial scale, not laboratory scale, and moreover, was able to provide an artificial zeolite of which the obtained crystal composition is high-purity.

What is claimed is:

1. A method for producing an artificial zeolite in which a high-purity artificial zeolite is industrially mass produced, the method comprising carrying out soaking treatment of fly ash in an alkaline aqueous solution at a temperature of 5 to 25° C. for 1 to 48 hours, subsequently carrying out a second soaking treatment with an acidic aqueous solution of pH 1.0 or less by adding acid to the soaking alkaline aqueous solution containing fly ash at a temperature of 5 to 25° C. for 1 to 48 hours, then performing solid-liquid separation while water washing and dewatering in a centrifuge, thereby synthesizing a starting composition, and performing hydrothermal reaction treatment to the starting composition.

2. The method for producing the artificial zeolite in which the high-purity artificial zeolite is industrially mass produced as set forth in claim 1, wherein said artificial zeolite is an A-type artificial zeolite in which the starting composition comprises in molar ratios 1.0 to 2.0 for $SiO_2/Al_2O_3$, 0.5 to 1.2 for $Na_2O/SiO_2$, and 40 to 60 for $H_2O/Na_2O$.

3. The method for producing the artificial zeolite in which the high-purity artificial zeolite is industrially mass produced as set forth in claim 1, wherein said artificial zeolite is an X-type artificial zeolite in which the starting composition comprises in molar ratios 2.5 to 5.0 for $SiO_2/Al_2O_3$, 0.5 to 1.2 for $Na_2O/SiO_2$, and 40 to 60 for $H_2O/Na_2O$.

4. The method for producing the artificial zeolite in which the high-purity artificial zeolite is industrially mass produced as set forth in claim 1, wherein said artificial zeolite is a Y-type artificial zeolite in which the starting composition comprises in molar ratios 10 to 27 for $SiO_2/Al_2O_3$, 0.5 for $Na_2O/SiO_2$, and 40 to 60 for $H_2O/Na_2O$.

5. The method for producing the artificial zeolite in which the high-purity artificial zeolite is industrially mass produced as set forth in claim 1, wherein said artificial zeolite is an MOR-type artificial zeolite in which the starting composition comprises in molar ratios 7.0 to 16 for $SiO_2/Al_2O_3$, 2.6 for $Na_2O/SiO_2$, and 56 for $H_2O/Na_2O$.

6. The method for producing the artificial zeolite in which the high-purity artificial zeolite is industrially mass produced as set forth in claim 1, wherein said artificial zeolite is a Na—P type artificial zeolite in which the starting composition comprises in molar ratios 1.0 to 12 for $SiO_2/Al_2O_3$, 0.5 to 1.2 for $Na_2O/SiO_2$, and 33 to 60 for $H_2O/Na_2O$.

* * * * *